United States Patent [19]

Fischbach

[11] 4,390,200

[45] Jun. 28, 1983

[54] SIDE HANDLE FOR UTENSILS

[75] Inventor: Wolfgang Fischbach, Daaden, Fed. Rep. of Germany

[73] Assignee: Heinrich Baumgarten KG Eisen- und Blechwarenfabrik, Neunkirchen, Fed. Rep. of Germany

[21] Appl. No.: 240,710

[22] Filed: Mar. 5, 1981

[30] Foreign Application Priority Data

Mar. 14, 1980 [DE] Fed. Rep. of Germany ........ 3009766
Mar. 25, 1980 [DE] Fed. Rep. of Germany .... 8008180[U]

[51] Int. Cl.³ .............................................. A47J 45/06
[52] U.S. Cl. ................. 294/27 H; 294/31 R; 16/110 A; 16/114 A
[58] Field of Search ...................... 294/27 H, 27 R, 28, 294/29, 30, 31 R, 31.2, 32, 33, 34, 15, 16; 16/114 A, 114 R, 110 A, 110 R; 220/94 R; D9/291; 215/100 A; 403/14, 291

[56] References Cited

U.S. PATENT DOCUMENTS

3,878,586  4/1975  Witte ................................. 16/110 A
3,883,169  5/1975  Fischbach ......................... 294/31 R
4,127,914  12/1978  Fischbach ......................... 16/110 A

*Primary Examiner*—James B. Marbert
*Attorney, Agent, or Firm*—Flynn, Thiel, Boutell & Tanis

[57] ABSTRACT

A handle apparatus for a utensil includes a supporting bracket secured to a wall of the utensil and having two spaced side walls approximately normal to the utensil wall. A handle has a recess of generally rectangular cross-sectional shape in which the bracket is received, the bracket side walls being adjacent and parallel to side surfaces of the recess. The recess top and bottom surfaces each have two grooves respectively adjacent the recess side surfaces, and each bracket side wall has two lugs on opposite edges thereof which are slidably disposed in respective said grooves. A retaining mechanism in the handle recess cooperates with the bracket to releasably secure the handle to the utensil.

5 Claims, 15 Drawing Figures

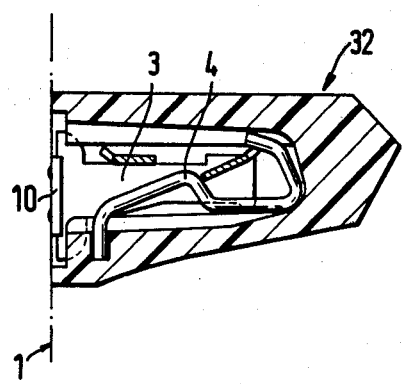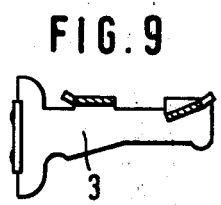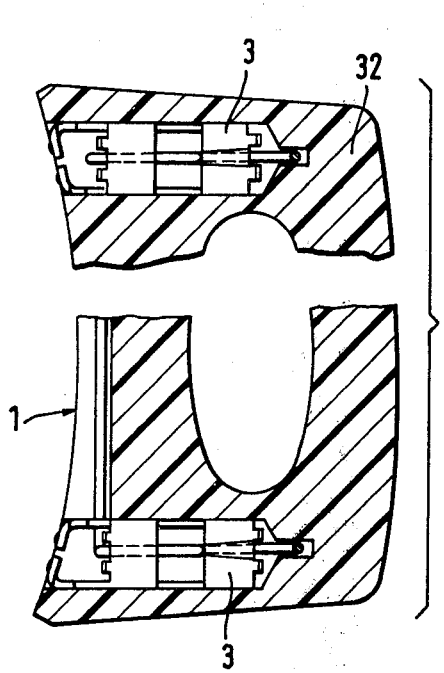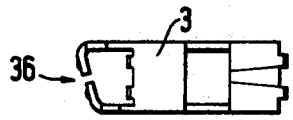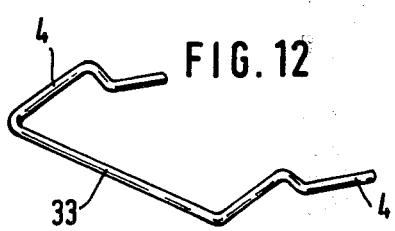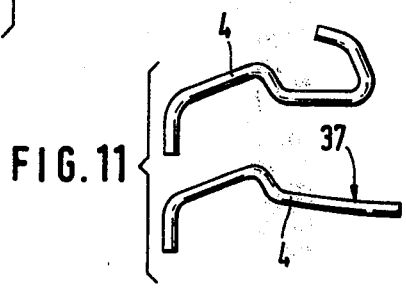

SIDE HANDLE FOR UTENSILS

FIELD OF THE INVENTION

The invention relates to a side handle for utensils and, more particularly, to a side handle having an abutment surface for securing the side handle to the utensil, a recess extending from the said surface at right angles relative thereto and thus relative to the utensil wall for the purpose of accommodating a supporting bracket fixable to the utensil, and a spring which secures the side handle to the utensil and which is supported against the supporting bracket and in the recess of the side handle.

BACKGROUND OF THE INVENTION

In the case of side handles of the kind specified initially, these are usually held by a spring which extends substantially at right angles to the utensil wall. The disadvantage of known side handles consists in that they begin to loosen in the course of use, so that they are no longer secured in a play-free manner to the utensil. The reason for this is that in the case of the known handles the spring not only has to secure the side handle to the utensil but also has to accept lateral guiding forces.

The invention has as its primary object so to construct a side handle of the kind specified initially as to ensure freedom from play over a long period of time in the securing of the side handle to the utensil.

SUMMARY OF THE INVENTION

According to the invention this object is achieved by a side handle which is characterised by a supporting bracket of U-shaped cross-section with a back portion and two identical-length side portions, the forward ends of the side portions comprising welding buttons bent-over inwardly through 90° and secured to the utensil, with an aperture in the back portion and with four supporting points formed in the region of the back portion for supporting the bracket in the recess in the handle of the utensil. The handle recess is of substantially square cross-section with three grooves formed in each of the upper and lower surfaces for accommodating the side portions of the supporting bracket and an S-shaped spring consisting of spring wire. The spring is disposed substantially in a single plane and is provided at its central portion with an inclined zone with which it bears on a side edge of the aperture in the supporting bracket, and the end of the spring which is directed towards the abutment surface of the side handle is fixed to the handle. The width and height of the recess are so adapted to the supporting bracket that the side portions of the supporting bracket serve as guides for the handle.

In a utensil handle according to the invention the entire supporting function is taken over by the handle and the supporting bracket, i.e. the handle can support the utensil even without the spring. The spring simply has a securing and holding function and presses the handle so that the abutment surface thereof bears without play on the utensil wall. Since moreover the spring is secured in the fitting-on direction in the handle, firstly the handle can be pushed on to the supporting bracket with an easy sliding action and secondly because of the inclined spring zone abutting on the side edges of the supporting bracket the spring adjusts itself automatically.

The handle itself is guided on the supporting bracket by the lateral surfaces of the bracket, and also the roof or top surface of its recess bears on the four supporting points so that the forces acting on the pot or the handle are taken up directly by the supporting bracket. Moreover, torsional forces are also accepted by the supporting bracket directly, and are not transmitted to the spring. The spring has only the task of keeping the side handle pressed against the pot i.e. preventing the side handle from being pulled off the supporting bracket. As a result it is possible to keep the spring relatively small.

BRIEF DESCRIPTION OF THE DRAWING

Examples of the invention are described in detail hereinafter with reference to the drawings wherein:

FIG. 7 shows a sectional view of a further side handle constructed according to the invention, FIG. 8 shows a plan view of the handle according to FIG. 7, FIG. 9 shows a sectional side view of the supporting bracket for the handle of FIG. 7, FIG. 10 shows a plan view of the supporting bracket represented in FIG. 9, FIG. 11 shows two different types of spring, FIG. 12 shows two springs connected by a central portion, FIGS. 13 and 14 respectively show a sectional side view and a sectional plan view of a further embodiment of the side handle constructed according to the invention.

DETAILED DESCRIPTION

Figure 1:
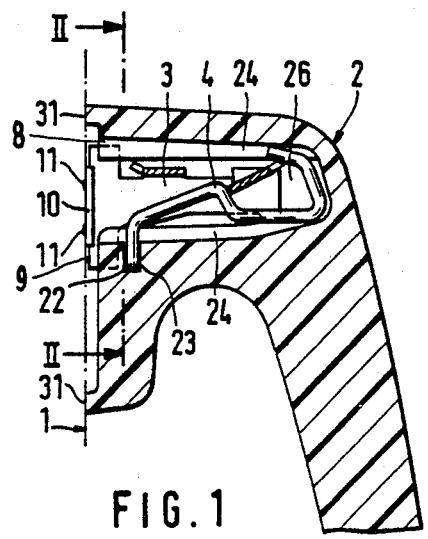
FIG. 1 shows a longitudinal section through a side handle constructed according to the invention.

In FIG. 1, 1 designates the wall of a pot not otherwise illustrated, and 2 the side handle 2 which is secured on this utensil wall with the help of a supporting bracket 3 and a spring 4.

Figure 3:
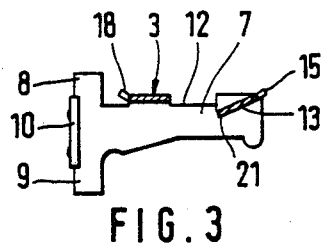
FIG. 3 shows a section through a supporting bracket according to the invention taken on the line III—III in FIG. 5.
Figure 5:
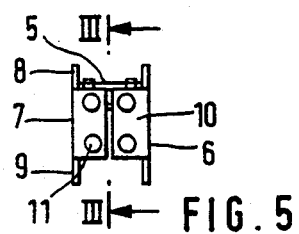
FIG. 5 shows an end view of the supporting bracket.
Figure 4:
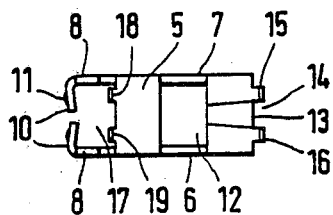
FIG. 4 shows a plan view on to the supporting bracket shown in FIG. 3.

The supporting bracket 3 is shown in FIGS. 3 to 5. This supporting bracket consists of a sheet metal element bent to a U-shaped cross-section, with a back portion or wall 5 and two side portions or walls 6,7 on the front ends of which two lugs 8,9 are arranged in each case. The front ends 10 of the side portions are tabs bent-over inwardly through 90° and comprise welding buttons 11 with which the supporting bracket 3 is welded to the utensil wall 1.

The back portion 5 comprises an aperture 12. The rear end 13 of the back portion is offset and provided with a small aperture or recess 14 so that the rear ends or tabs of the back portion form two supporting points 15,16. Moreover the front side of the back portion 5 comprises a further aperture 17, the ends likewise being tabs bent slightly upwards so that two further supporting points 18,19 are formed here also.

Figure 2:
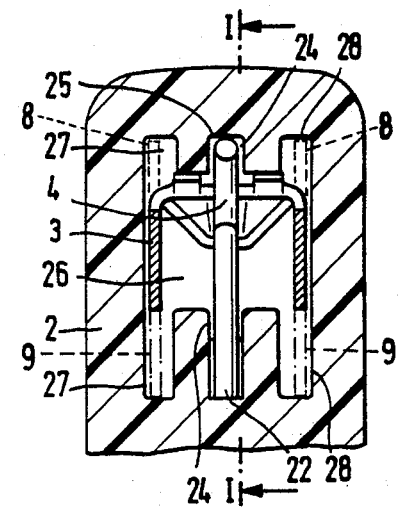
FIG. 2 shows a section taken on the line II—II of FIG. 1.

As shown in FIGS. 2 to 4, the offset of the rear end 13 of the back portion 5 comprises the central portion of the forward edge 21 thereof being bent downwardly, the adjacent portions of the edge 21 extending upwardly at an incline to the top edges of the side portions 6 and 7.

Figure 6:
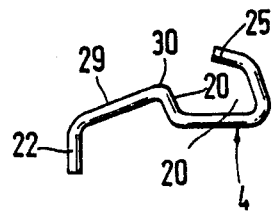
FIG. 6 shows a side view of a spring according to the invention.

The spring 4 is shown in FIG. 6. It is of substantially S-shaped form, bent to shape from spring wire, and comprises in its central portion an inclined zone 20 with which, in the fitted state, it abuts on the abutment edge 21 (FIG. 3). The front end 22 of the spring 4 is locked in a recess 23 of the handle 2, while the other upper end 25 of the spring is guided in a groove 24 in the handle 2. The groove 24 is situated in a substantially cross-sectionally square or rectangular recess 26 in the side handle 2. The width of the recess 26 corresponds more or less precisely to the width of the supporting bracket 3, so that the latter with its side portions 6,7 forms a guide for the side handle 2. In each of the floor or top surface and roof or bottom surface of the recess 26 there are arranged three grooves 27,28 and 24, of which the grooves 24 guide the spring 4. The two other grooves 27 and 28 serve as rotational movement preventing means for the lugs 8,9 of the supporting bracket 3.

To install the side handle 2, the spring 4 is inserted in the recess 26 of said handle and is locked with its end 22 in the recess 23. Then the side handle is fitted over the supporting bracket, the inclined zone 29 of the spring 4, which is in contact with the abutment edge 21, causing compression of said spring until the point 30 has gone beyond the abutment edge. The spring 4 then abuts with its inclined zone 20 on the abutment edge 21 and presses the handle with its abutment surface 31 against the utensil wall 1.

FIGS. 7 and 8 show sectional side and top views of a further embodiment of a side handle according to the invention. This side handle is secured by means of two supporting brackets 3, which are welded to the utensil wall 1 of a pot which is not shown in detail. The difference in the construction of the supporting brackets 3 with respect to the supporting bracket illustrated in FIGS. 3 and 4 consists solely in the fact that the end face 36 of the supporting bracket, by which the latter is secured to the utensil wall 1, is flattened in correspondence with the roundness of the utensil wall. These two supporting brackets are mounted as shown in FIG. 8, so that they extend away from the utensil wall 1 parallel to each other.

A spring 4, as shown in FIG. 6, is used to secure the side handle 32 to the supporting bracket and to the utensil wall. The spring 4 shown at the bottom of FIG. 11 can also be used instead of this type of spring, the end 37 of this spring 4 differing from the spring shown in FIG. 6 and at the top of FIG. 11.

Instead of two individual springs 4, it is also possible to use two springs 4 connected together by means of a central connecting portion 33, as illustrated in FIG. 12. The advantage of such a spring lies in the fact that assembly is rendered essentially easier, as both springs can be manipulated and assembled together.

Figure 13:
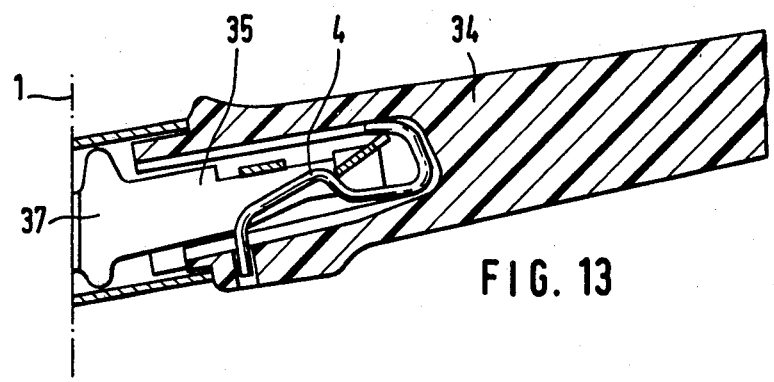
Figure 14:
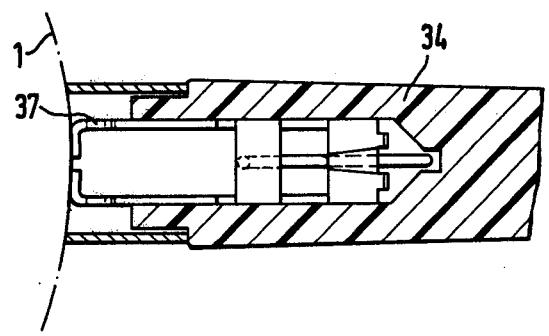
Figure 15:
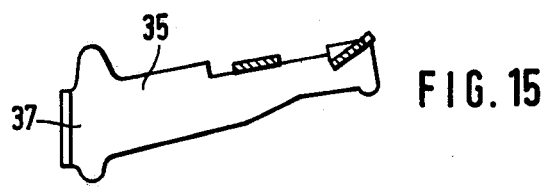
FIG. 15 shows a sectional side view of the supporting bracket used in the embodiment according to FIGS. 14 and 15.

FIGS. 13 to 15 show the attachment of a stem handle 34 by means of a supporting bracket 35 according to the invention and a spring 4 illustrated in FIG. 6. The difference with respect to the embodiment according to FIG. 1 lies in the shape of the supporting bracket. This bracket has a part 37 which is extended towards the utensil wall and which bears the welding projections in a known manner.

The embodiments described above show that different types of side handles can be permanently secured free from play to the utensil wall by means of a supporting bracket constructed according to the invention and the adapted springs, without the necessity of using screws as fastening elements.

The embodiments of the invention in which an exclusive property or privilege is claimed are defined as follows:

1. A handle apparatus for a utensil, comprising a supporting bracket secured to a wall of said utensil and having two laterally spaced and generally parallel side walls extending away from said wall of said utensil approximately perpendicular thereto, a handle having an abutment surface engaging said wall of said utensil and a recess in said abutment surface in which said supporting bracket is slidably received, said recess being of generally rectangular cross-sectional shape and having spaced, generally parallel side surfaces and spaced, generally parallel top and bottom surfaces extending between said side surfaces, said top and bottom surfaces each having two laterally spaced grooves therein adjacent and generally parallel to respective said side surfaces, said side walls of said supporting bracket each being substantially parallel to and adjacent a respective said side surface of said recess, and each said side wall of said supporting bracket having two portions slidably disposed in respective said grooves in said top and bottom surfaces of said recess, and retaining means disposed in said handle recess and cooperable with said supporting bracket for releasably securing said handle on said utensil, said retaining means resiliently urging said supporting bracket into engagement with said top surface of said recess and said abutment surface on said handle into engagement with said wall of said utensil, whereby said adjacency of said side walls of said bracket and said side surfaces of said recess and said engagement of said portions of said side walls of said bracket with said grooves in said recess substantially prevents twisting movement of said handle relative to said utensil.

2. The handle apparatus of claim 1, wherein said portions of each said side wall of said supporting bracket disposed in said grooves are respective upwardly and downwardly projecting lugs located adjacent said wall of said utensil, and wherein said supporting bracket includes a further wall extending between and secured to the upper edges of said side walls at a location spaced from said wall of said utensil and having two upward projections thereon which are urged against said top wall of said recess by said retaining means.

3. The handle apparatus of claim 2, wherein said top and bottom surfaces of said recess each have a further groove therein substantially parallel to and intermediate said first-mentioned grooves, wherein there are four said projections on said further wall of said bracket, a respective pair of said projections engaging said top surface of said recess on each side of said further groove, wherein said further wall of said bracket has an aperture therein and an edge of said aperture farthest from said wall of said utensil is bent downwardly away from said top surface of said recess, and wherein said retaining means includes a wire spring supported in said further grooves, secured against movement relative to said handle in directions parallel to said further grooves, and engaging said edge of said aperture to urge said projections on said further wall of said bracket against said top surface of said recess and said abutment surface of said handle against said wall of said utensil.

4. The handle apparatus of claim 3, wherein said supporting bracket includes respective tabs at the end of each said side wall adjacent said wall of said utensil which extend toward each other along and are secured to said wall of said utensil, and wherein said supporting bracket is made of a single, bent piece of sheet metal material, said projections thereon being upwardly bent metal tabs.

5. The handle apparatus of claim 1, including two said supporting brackets secured to said wall of said utensil at spaced locations, wherein said handle includes two said recesses in said abutment surface which each receive a respective said supporting bracket, and wherein said retaining means includes a said spring secured to said handle in each said recess and cooperable with said associated supporting bracket for releasably securing said handle on said utensil.

* * * * *

UNITED STATES PATENT AND TRADEMARK OFFICE
CERTIFICATE OF CORRECTION

PATENT NO. : 4 390 200
DATED : June 28, 1983
INVENTOR(S) : Wolfgang Fischbach

It is certified that error appears in the above-identified patent and that said Letters Patent is hereby corrected as shown below:

Col. 6, line 1; change "claim 1" to ---claim 4---.

Signed and Sealed this

Eighteenth Day of October 1983

[SEAL]

Attest:

GERALD J. MOSSINGHOFF

Attesting Officer

Commissioner of Patents and Trademarks